United States Patent [19]

Agarwal

[11] Patent Number: 4,983,652

[45] Date of Patent: Jan. 8, 1991

[54] POLYMER COMPLEX ADHESIVE COMPOSITIONS

[75] Inventor: Pawan K. Agarwal, Bridgewater, N.J.

[73] Assignee: Exxon Research & Engineering Company, Florham Park, N.J.

[21] Appl. No.: 287,422

[22] Filed: Dec. 21, 1988

[51] Int. Cl.$^5$ .................. C08L 9/00; C08L 79/00; C08L 81/08; C08L 95/00

[52] U.S. Cl. ............................ 524/66; 524/211; 524/230; 524/394

[58] Field of Search ............... 524/211, 394, 398, 66, 524/230

[56] References Cited

U.S. PATENT DOCUMENTS 4,519,250 5/1985 Agarwal et al. ............... 524/518
4,761,444 8/1988 Agarwal et al. ............... 524/518

Primary Examiner—Allan M. Lieberman
Attorney, Agent, or Firm—Richard E. Nanfeldt

[57] ABSTRACT

This invention relates to hot melt adhesive compositions which includes a polymer complex of an amine containing polymer and a co- or terpolymer, about 3 to about 100 parts by weight of a polymer complex per 100 parts by weight of the highly unsaturated hydrocarbon rubber, wherein the neutralized sulfonated elastomeric polymer has about 0.2 to about 5 weight percent of chemically combined sulfur and about 25 to about 200 parts by weight of a hydrocarbon resin of a petroleum or coal tar distillate, aliphatic dienes and mono and diolefins, cyclic olefins of 5 to 6 carbon atoms and hydrogenated poly cyclics per 100 parts by weight of the polymer complex.

11 Claims, No Drawings

POLYMER COMPLEX ADHESIVE COMPOSITIONS

BACKGROUND OF THE INVENTION

1. Field of the Invention

This invention relates to adhesive compositions which include a polymer complex of an amine containing polymer and a sulfonate co- or terpolymer, wherein the neutralized sulfonated co- or terpolymer has about 0.2 to about 5 mole percent of chemically combined sulfur obtained by copolymerization, and about 25 to 200 parts by weight of a hydrocarbon resin of a petroleum or coal tar distillate, having about 5 to about 6 carbon atoms, the hydrocarbon resin being composed of aliphatic dienes and monoolefins per 100 parts by weight of the polymer complex.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Besides this energy requirement for the formation of the bond, there is another complication with the use of water based adhesive. For a uniform coating a good uniform wetting of the substrate surface is desired, which is not easily achieved.

With the solvent-based adhesives usually a good wetting is achieved; however, their use has been becoming extremely restrictive due to expensive energy requirements for the evaporation of organic solvents fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

Recently the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification a strong and durable bond is formed.

The key requirements of resins suitable for hot melt adhesive applications are that they should have good physical properties, e.g., tensile strength, etc., at ambient conditions, and they can flow easily at fabrication temperatures and they must have sufficiently good compatibility that they do not phase separate on storage or during subsequent use. The ethylene vinyl acetate (EVA) copolymers and styrene block copolymers, such as Kraton, have been extensively used as hot melt adhesives; however, their use has been limited largely to pressure sensitive adhesives.

There is a significant demand in the marketplace today for polymer systems which exhibit good green strength or tensile properties at ambient temperatures which, when heated to a predetermined temperature, will give good flow such that they may be applied to a coating or substrate by melt extrusion or other suitable techniques. In the past it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

PRIOR ART

Several U.S. Patents have described sulfonated polymers such as sulfonated Butyl and sulfonated EPDM in adhesive applications (e.g., U.S. Pat. No. 3,867,247 and U.S. Pat. No. 3,801,531). It is important to distinguish the instant invention over those prior art systems. The former patent is directed at a sulfonated Butyl cement which is solvent based and is employed to laminate various substrates. It is important to note that the instant invention differs dramatically from that patent as follows:

(a) The instant invention is directed at sulfonated co- or terpolymers formed by a copolymerization process whereas most of the prior art deals with sulfonated Butyl rubber (e.g., U.S. Pat. No. 3,867,247) which was formed by sulfonation of the Butyl rubber.

(b) The instant invention may optionally include a preferential plasticizer capable of associating with the metal sulfonate groups and thereby reducing the melt viscosity of the resulting blends to make the systems more processable.

(c) The polymers used in the instant invention are chemically different from those of the patents above giving rise to different properties and compatibilities.

The use of sulfonated copolymers as adhesive compositions have been disclosed by Agarwal, et al, in U.S. Pat. No. 4,517,250. It is important to distinguish the compositions disclosed in that patent versus the present. In the instant invention the copolymers of isoprene and sodium styrene sulfonate obtained via emulsion polymerization reaction are subsequently converted to copolymers of isoprene and zinc styrene sulfonates via ion exchange process whereas U.S. Pat. No. 4,517,250 disclosed compositions primarily of copolymers of isoprene and sodium styrene sulfonates. In the present invention it is essential that the counterion of the styrene sulfonate moiety be a transition metal ion such as zinc, copper, silver, etc.

The most significant difference between the present invention and that of U.S. Pat. No. 4,517,250 is that present invention teaches the formation of a polymer complex through the use of an amine containing polymer which subsequently is the basis for various hot melt adhesive compositions. It is due to this interpolymer complex formation excellent hot melt adhesive properties are attained. U.S. Pat. No. 4,517,250 does not teach any such interpolymer complex formation.

SUMMARY OF THE INVENTION

This invention relates to adhesive compositions which include a polymer complex of an amine containing polymer and a sulfonate co- or terpolymer, wherein the neutralized sulfonated co-or terpolymer has about 0.2 to about 5 mole % of neutralized sulfonate groups per 100 grams of the neutralized sulfonated polymer and about 25 to about 200 parts by weight of a hydrocarbon resin of a petroleum or coal tar distillate, having about 5 to about 6 carbon atoms, said hydrocarbon resin having aliphatic dienes and monoolefins therein per 100 parts by weight of the polymer complex and optionally, about 1 to about 50 parts of a preferential plasticizer per 100 parts of the neutralized sulfonated co- or terpolymer can be added to the composition. The adhesive compositions of the instant invention are contemplated to be used as a hot melt adhesive system or in the alternative to dissolve the polymer and tackifier in a solvent to form a pressure sensitive adhesive.

GENERAL DESCRIPTION

The present invention relates to unique and novel adhesive compositions which comprises a neutralized sulfonated co- or terpolymers complexed with an amine containing polymer to form a complex, and a hydrocarbon resin, wherein the compositions can be optionally added an ionic preferential plasticizer oil, and/or a filler or vulcanizing agent thereby modifying the rheological and physical properties of the hot melt adhesive compositions.

A. Sulfonated Polymer and Process for Forming

The neutralized sulfonated solid co- or terpolymers of this present instant invention are formed by a copolymerization process.

These solid sulfonated co- or terpolymer of the instant invention comprise at least 80% by weight of at least one conjugated diene having from 4 to 12 carbon atoms and a minor proportion of a metal or amine neutralized sulfonate monomer characterized by the formula:

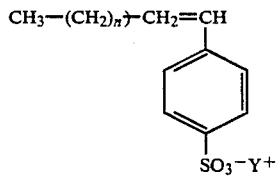

wherein $n=1$ or 2 and Y is a cation selected from Groups IA, IIA, IB and IIB of the periodic table or an amine of the formula:

and where $R_1$ and $R_2$ can be aliphatic groups of $C_1$ to $C_{12}$ or hydrogen, the co- or terpolymer being water insoluble having at least 0.2 weight percent sulfur to less than 3 weight percent sulfur chemically combined.

The instant invention relates to the formation of sulfonate containing copolymers which are preferably formed by a free radical copolymerization process. The monomers used in the free radical emulsion copolymerization process are conjugated dienes which are copolymerized with sulfonate containing monomers.

In general, the conjugated diene, isoprene and the sulfonate containing monomer are dispersed in a water phase in the presence of an initiator which is preferably soluble in the conjugated diene phase and a suitable surfactant, wherein the temperature is sufficient to initiate polymerization. The resultant latex is coagulated usually by the addition of an aqueous salt solution and the recovered co- or terpolymer is washed with water and subsequently dried under vacuum at room temperature.

The co- or terpolymers formed from the free radical emulsion copolymerization process of the instant invention can be generally described as having an Mn of about 5,000 to about 200,000 more preferably about 10,000 to about 100,000. The co-or terpolymers of the instant invention contain about 0.2 to about 3 weight % of chemically combined sulfur, more preferably about 0.5 to about 3 and most preferably about 0.6 to about 3, most preferably about 0.7 to about 2.0 weight % sulfur. Typical, but non-limiting examples of the copolymers which can be formed by the instant free radical emulsion copolymerization process are: butadiene/ sodium styrene sulfonate copolymer and isoprene/ sodium sulfonate styrene copolymer. Obviously, an infinite number of copolymers and even terpolymers can be formed by the instant free radical copolymerization process. Typically, the copolymerization of any conjugated diene as so defined herein can be readily copolymerized with any sulfonate containing monomer as is defined herein. Terpolymers with styrene, acrylonitrile, vinyl chloride as the termonomers with the aforementioned dienes are also contemplated provided that no more than 10 weight percent of the termonomer is combined therein.

CONJUGATED DIENES

The conjugated dienes of the instant invention are generally defined as having about 5 to about 10 carbon atoms more preferably about 4 to about 6 carbon atoms. Typical, but non-limiting examples of acyclic conjugated dienes are piperidene, 1,3-butadiene, isoprene (2-methyl-1,3butadiene), 2,3-dimethyl-1,3-butadiene, 1,3-pentadiene, 2-methyl-1,3-pentadiene, 2,3-dimethyl-1, 3-pentadiene, 3-methyl-1,3-pentadiene, 2-phenyl butadiene, chloroprene piperidene. The preferred conjugated dienes of the instant invention are selected from the group consisting of 1,3-butadiene, isoprene and chloroprene. In the formation of the sulfonate containing copolymer, one copolymerizes one of the aforementioned conjugated dienes with the sulfonate containing monomer. Sulfonate containing terpolymers can be readily formed by copolymerizing the sulfonate containing monomer with a mixture of two of the above identified conjugated dienes.

Alternatively, other co or terpolymers of vinyl monomers such alkyl acrylates or methacrylates, or alkyl acrylate amides having about 4 to about 12 carbon atoms could be copolymerized with sulfonate containing monomers.

SULFONATE CONTAINING MONOMERS

The sulfonate containing monomers of the instant invention which are water soluble can be generally described as a monomer having unsaturation and a metal or amine sulfonate group. The metal or amine neutralized sulfonate monomer is characterized by the formula:

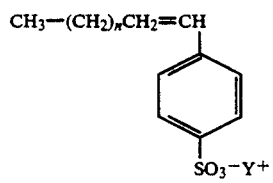

wherein $n=1$ or 2 and Y is a cation selected from Groups IA, IIA, IB and IIB of the periodic table or an amine of the formula:

where $R_1$ and $R_2$ can be aliphatic groups of $C_1$ to $C_{12}$ or hydrogen. Particularly suitable metal cations are sodium, potassium, and zinc, and an especially preferred metal cation is sodium. A typical but non-limiting example of suitable sulfonate containing monomers is:

sodium styrene sulfonate.

An especially preferred sulfonate containing monomer is sodium sulfonate styrene. The molar ratio of sulfonate containing monomer to conjugated diene is about 1/200 to about 1/5, more preferably about 1/150 to about 1/6, and most preferably about 1/100 to about 1/9.

The redox emulsion polymerization recipe used in this invention is effective in initiating the copolymerization of water-insoluble and water-soluble comonomers in an emulsion system. Because the peroxide initiator is dissolved in the monomer and the redox activator is dissolved in the water, the surface of the micelle/growing polymer particle is believed to be the locus of formation of initiator molecules as well as the polymerization locus. Water phase homopolymerization of the polar, water-soluble monomer is effectively depressed because of low primary radical concentration in the aqueous phase. However other initiators are also contemplated for preparation of these systems.

A variety of free radical catalysts can be employed in this invention. This includes a preferential class of free radical initiators such as benzoyl peroxide, cumene peroxide, t-butyl hydroperoxide and similar systems which will be preferentially soluble in the monomer phase as opposed to the aqueous phase. There are a larger number of such peroxides used in the art and those having the appropriate solubility behavior and suitable decomposition temperatures in the presence of the reducing agents are satisfactory for the purposes of this invention. Water soluble initiators may also be employed, although the characteristics of the products may be different.

The surfactants employed for this invention are varied and well known in the art. The typical emulsifiers or surfactants can be employed, however, some are more effective than others in generating latexes of better stability. A preferred emulsifier is sodium lauryl sulfate.

The buffering agents employed in the instant polymerization process are selected from the group consisting of sodium carbonate, ammonia, sodium acetate, trisodium phosphate, etc. These buffering agents are employed at a concentration of about 0.1 to about 5 grams/100 grams water employed in the emulsion system.

Chain transfer agents can be readily employed in the instant polymerization process for controlling the molecular weight of the resultant copolymer. The concentration of chain transfer agent is about 0.05 to about 0.5 grams/100 grams of the combined weight of the sulfonate containing monomer and the conjugated diene.

The free radical emulsion copolymerization of the water soluble sulfonate containing polymer and the conjugated diene yields a stable latex, wherein the resultant water insoluble co- or terpolymer is not covalently crosslinked and possesses substantial ionic crosslinking, and has about 0.2 to about 3 weight percent of chemically combined sulfur, more preferably about 0.5 to about 3. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble co- or terpolymer is recovered by filtration and subsequently washed with water and dried under vacuum conditions at about warm temperature. Alternatively, the polymer can be coagulated by precipitation with alcohol such as methanol.

B. Amine Containing Polymers

We have surprisingly found that a very important factor in determining the strength of the interaction between the amine-containing polymer and the sulfonate-containing co- or terpolymer is the nature of the counterion. There are, broadly speaking, three major classes of such counterions. The first class, which are less preferred, are those elements of Group IA and Group IIA, which include Li, Na, K, etc., Be, Mg, Ca, etc. We have found that these species do not interact as strongly with amine groups as the more preferred species described below. Those elements are commonly defined as members of the transition elements (see chemical text: "Chemical Principles and Properties", by M. J. Sienko and R. A. Plane, McGraw Hill Book Co., 1974, page 19). Such cations are best exemplified by zinc and interact strongly with pyridine and similar amines. As a consequence, a zinc neutralized sulfonated co- or terpolymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated co- or terpolymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry (based on small molecular analogs).

Preferably, the amine content in the basic polymer is expressed in terms of basic nitrogen. In this respect, the nitrogen content in amides and similar nonbasic nitrogen functionality is not part of the interacting species. For example, the amount of vinyl pyridine in the amine-containing polymer can vary widely, but should range from less than 50 weight percent down to at least 0.2 weight percent, more preferably about 0.2 to about 10.0 weight percent in the case of an alkyl methacrylate/vinyl pyridine copolymer or an acrylate/vinyl pyridine copolymer having the formula:

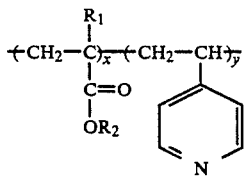

wherein $R_1$ is H or an alkyl group having about 1 to about 8 carbon atoms, $R_2$ is an alkyl group having about 1 to about 18 carbon atoms, x is about 50 to about 99.8 weight percent, more preferably about 95 to about 99.8 weight percent, y is about 0.136 to about 34.0 weight percent, more preferably about 0.136 to about 6.8 weight percent. Another example is a copolymer of styrene with 4-vinylpyridine.

A minimum of three basic groups must be present on the average per polymer molecule and the basic nitrogen content generally will range from 2 meq. per 100 grams of polymer up to 500 meq. per 100 g. A range of 8 to 200 meq. per 100 g. is preferred.

It is desirable that these organic polymer backbones of the sulfonated co- or terpolymers (in the absence of the sulfonate groups) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by appropriate texts (e.g., Polymer Handbook, edited by Brandrup and Immergut, Interscience Publishers, 1967, section IV-341). In the absence of appropriate polymer-solvent compatibility knowledge, this can be determined experimentally by observing whether the selected polymer will be soluble in the solvent at a level of gm polymer per 100 ml solvent. If the polymer is soluble, then this demonstrates that it is an appropriate backbone for modification with sulfonate groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

We have also observed that polymers normally insoluble in non-polar solvents such as mineral oils, that the interaction via complexation can include solubility if one of the polymers is sufficiently soluble.

The sulfonated co- or terpolymers of the instant invention may be neutralized prior to incorporation into the organic solvent, or by neutralization of the acid form in situ. For example, preferably the acid derivative is neutralized immediately after preparation. For example, if the sulfonation of hexene-1/ENB is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The basic nitrogen-containing polymer such as a lauryl methacrylate/vinyl pyridine copolymer or styrene/vinyl pyridine of the polymer complex is usually formed by free radical copolymerization using techniques well-known in the polymer literature. Such polymers can be prepared by a variety of techniques by reacting a basic nitrogen-containing monomer with the alkyl acrylates, or alkyl methacrylates, such as lauryl methacrylate. An emulsion polymerization process is generally preferred, but other processes are also acceptable.

The polymer complex of the sulfonated co-or terpolymer and the basic nitrogen-containing polymer can be formed by forming a first solution of the sulfonated co- or terpolymer in an organic liquid and a second solution of the basic nitrogen-containing polymer in the organic liquid, wherein the organic liquid which has a solubility parameter of less than 9.5 and a viscosity of less than about 35 centipoises and is selected from the group consisting of mineral oil, synthetic oil, lubricating oils, alkanes, cycloalkanes and aromatics and mixtures thereof. Alternately both components of the complex can be simultaneously dissolved in the same solvent systems at the desired concentrations. The concentration of the sulfonated co- or terpolymer in the first solution is about 0.01 to about 10 grams per 100 ml of organic liquid, more preferably about 0.1 to about 5. The concentration of the basic nitrogen-containing polymer in the second solution is about 0.01 to about 10 grams per 100 ml of the organic liquid, more preferably about 0.1 to about 5, and most preferably about 0.1 to about 2. The two solutions of the sulfonated co- or terpolymer and the basic nitrogen-containing polymer are mixed together to form the polymer complex, wherein either the sulfonated polymer or the basic nitrogen-containing polymer such as lauryl methacrylate vinyl pyridine copolymer can be substantially in excess of the other. The formation of the complex is schematically represented by:

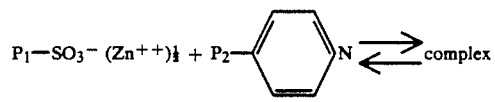

The presence of an excess of one component over the other offers a unique opportunity to alter the viscosity-temperature, viscosity-concentration or viscosity shear rate profiles of such solutions. In the creation of the complex a combination of two polymers interacting with an excess of one (such as the lauryl methacrylate/vinyl pyridine copolymer), we have created a complex which is, in turn, plasticized. Such a system will display modest viscosity at low or ambient temperatures:

Complex + Excess Polymer Component ⇌ Plasticized Complex

The application of heat to the right-hand side of Equation 2 would be expected to shift the equilibrium modestly to the left. Consequently, the higher viscosity complex would be favored with a potential increase in solution viscosity.

The weight ratio of the neutralized sulfonated co- or terpolymer to the copolymer of vinyl pyridine with styrene or an alkyl acrylate or an alkyl methacrylate is 20/1 to 1/20.

Thus, this concept describes the interaction of two polymers which can give rise to new solution phenomena. A second consequence of this concept is that if such solutions are diluted with non-interactive (less interactive) solvent, such as mineral oil or similar low polarity diluents, the result will be a diminution of the plasticizer component with a relative increase in complex viscosity. Thus, unlike normal polymer solutions which drop off dramatically upon dilution, these solutions may decrease much less in their solution viscosity. Such hydrocarbon or oil solutions have not been available previously. The concentration of the polymer complex in the organic liquid is about 0.01 to about 20 grams per 100 ml, more preferably about 0.1 to about 10, and most preferably about 0.2 to about 10.

The method of the instant invention includes optionally incorporating a cosolvent, for example, a polar cosolvent, into the mixture of organic liquid and polymer complex, to solubilize the pendant sulfonate groups. The polar cosolvent will have a solubility parameter of at least 10.0, more preferably at least 11.0, and may comprise from 0.1 to 40, preferably 0.5 to 20 weight percent of the total mixture of organic liquid, sulfonated polymer, and polar cosolvent.

While this definition of polar cosolvent is adequate, we also observe that cosolvents with especially long alkyl groups with hydroxyl groups on one or both ends are especially preferred. These cosolvents are based on $C_{10}$–$C_{30}$ alkyl chains.

In addition to the requirements for ionic polymer, organic liquid and polar cosolvent, there is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S_p$, then we require that:

$$S_p \geq S_L + 1.0$$

In other words, the polar cosolvent will be substantially more polar than the organic liquid to be thickened.

Normally, the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent. The polar cosolvent must be present in amounts of from 20 to 600 moles per mole of ionic group in order to give the desirable results of the instant invention and preferably from 30 to 400 moles per mole of ionic group. This level of cosolvent is desirable in creating solutions which can be isoviscous with temperature on concentration.

C. Plasticizers

The metal sulfonate containing polymers at higher sulfonate levels can possess extremely high melt viscosities and are thereby difficult to process. The optional addition of ionic group (preferential) plasticizers markedly reduces melt viscosity and frequency enhances physical properties. To the polymer complex of the amine containing polymer and the neutralized sulfonated co- or terpolymer is added, in either solution or to the crumb of the sulfonated co- or terpolymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic, or stearic acids and mixtures thereof; e.g., zinc stearate, magnesium stearate, or zinc laurate.

The preferential plasticizer is incorporated into the polymer complex of the amine containing polymer and neutralized sulfonated co- or terpolymer at about 3 to about 75 parts by weight based on 100 parts by weight of the polymer complex, more preferably at about 7 to about 50, and most preferably at about 10 to about 30. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof. The resultant neutralized sulfonated co- or terpolymer with preferential plasticizer is isolated from the solution by conventional steam stripping and filtration.

D. Commercial Tackifier Resins

To the hot melt adhesive composition is added a commercial tackifying resin having a softening point of about 0° to about 160° C., more preferably about 50° to about 140° C. and most preferably about 70° to 120° C. A variety of commercial tackifier resins are available. Some of these resins contain and/or pirene base polyterpene resins as the main ingredient while others are derived from the polymerization of petroleum or coal distillates which consist of aliphatic dienes, mono and di-olefins and cyclic olefins having about 5 to about 6 carbon atoms. The latter type of tackifiers have primarily piperlene and/or isoprene structure. A general but excellent description of tackifying resins derived from petroleum derivatives can be found in, for example, *Encyclopedia of Polymer Science and Technology*, Vol. 9, Pages 853 to 860, chapter by John Findlay, published by John Wiley & Sons, NY (1968).

Typical but non-limiting tradenames of these commercial tackifiers are Wingtak of Goodyear, Escorex of Exxon, Piccolyte of Hercules and Zonrez of Arizona Chemicals. Recently these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquid or light-colored solids at room temperature. Most often their initial color (Gardner) is 3.0 to about 7.0 and the density from about 0.7 to 1.0 gm/cm$^3$ at room temperature. The acid number of these resins is usually less than 1. In general, the molecular weight of these commercial tackifying resins is not homogeneous, it spreads the number average molecular weight Mn can be from about 300 to about 5000 and more preferably about 500 to about 2000 and most preferably about 700 to 1600.

As well-known to this familiar with the use of tackifying resins, because of their wide range compatibility, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 700 parts by weight per 100 parts by weight of the polymer complex, more preferably about 50 to about 500, and most preferably about 75 to about 300.

E. Method of Forming Blend Adhesive Composition

The blend compositions of the polymer complex of the amine containing polymer and neutralized sulfonated co- or terpolymer with or without preferential plasticizer and the hydrocarbon tackifier resin can be formed by techniques well known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Adsorption grams of oil/100 grams of filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.9 |
| Magnesium Silicate | Mistron Vapor | 60–70 | 2.75 | 2 | 9.0–7.5 |

G. Oil Extended Adhesive Compositions

It is observed that the blend composition of the instant invention can also include oils to further improve low temperature properties and tack characteristics of the resulting adhesive levels of oil of less than about 100 parts by weight per 100 parts of the polymer complex can be incorporated, more preferably about 1 to about 90 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffin petroleum oils. Typical oils are illustrated in Table II.

In addition other polymers can be incorporated into the compositions of this invention such as polyisobutylene, ethylene propylene copolymer or ethylene propylene diene terpolymer, ethylene vinyl acetate copolymers, natural rubber, polyisoprene, cis 1,2 polybutadiene, 1,4 polybutadiene and similar polymers which are largely elastomeric and are reasonably compatible with the sulfonate copolymers or terpolymers of this invention as long as the added polymer does not constitute more than 90 parts by weight per 100 parts of the polymer complex which is the primary ingredient of this invention.

TABLE II

| Type Oil | Oil Code % | Viscosity ssu | Mn | % Polars | % Aromatic | % Saturates |
|---|---|---|---|---|---|---|
| Paraffinic | Sunpar 115 | 115 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 | of equipment. The Banbury mixing device is the preferred batch type mixer, and the twin screw extruder is the preferred continuous mixer.

F. Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at less than about 800 parts by weight per 100 parts by weight of the neutralized polymer complex, more preferably at about 50 to about 500; and most preferably at about 75 to about 300. Typically, these fillers have a particle size of about 0.03 to about 20 microns, more preferably about 0.3 to about 10, and most preferably about 0.5 to about 10. The oil H. Method of Fabrication of Adhesive Compositions Because of the significant advances in the packaging technology, the hot melt adhesive compositions can be used by conventional polymer fabricating techniques. After the blending is complete, the adhesive mass can either be extruded and/or calendered to a uniform thickness on top of the substrate which could be paper, cloth, aluminum foil or glass fabric. The temperature and the throughput of the extrusion are variable depending upon the viscosity of the tackifying mass and the desired coating thickness. Typically the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terephthalic acid, vinyls such as a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum and alloys thereof can also be employed. In general, the backings employed are those which have heretofore been conventionally employed in preparing pressure sensitive labels, tapes, sheetings and the like and the selection of any particular substrate material is not a specific novel feature of the present invention.

DETAILED DESCRIPTION OF THE INVENTION

The advantages of the hot melt adhesive compositions of the present invention can be more readily appreciated by reference to the following examples and tables. Unless otherwise specified, all measurements are in parts per hundred by weight.

The peel strength values were obtained by a method similar to ASTM D-429 adhesion test. In brief, the samples were sandwiched between mylar sheets and pressed to a thickness of about 25 mils using a hot press. Rectangular strips of ¼" width and 3" long were cut and 90° peel tests were performed on an Instron at room temperature. The resin free sections of the mylar film were clamped into air jaws to avoid any slippage during pulling. The samples wee pulled at 5"/min. crosshead speed. The force and elongation of the samples were recorded on a strip recorder. The force necessary to separate the mylar sheets was taken as the peel strength of the blend. The initial peak values are reported in the fifth column of Table IV.

The following preparations describe the synthesis of an isoprene/sodium styrene sulfonate copolymer. Following similar preparation techniques the butadiene/-sodium styrene sulfonate copolymer or terpolymers such butadiene-isoprene sodium styrene sulfonate could be prepared by those skilled in the art.

EXAMPLE 1

EMULSIONS COPOLYMERIZATION OF ISOPRENE AND SODIUM STYRENE SULFONATE MONOMERS

In a one gallon stainless steel pressure vessel the following ingredients were chargedisoprene 1150 gms and a blend of 1500 gm of distilled, deionized and deaerated water with 100 gms of sodium styrene sulfonate, 50 gms of sodium lauryl sulfate and 28 gms of dodecylthiol. The vessel was closed and purged with dry nitrogen. Later the mixing was started and the reactor temperature was set at 45° C. To initiate the reaction, 4.25 gms of potassium persulfate dissolved in 50 ml was injected into the vessel.

After three hours reaction time, the reaction was stopped by discharging the reactor contents into a container which contained 1.5 gms of hydroquinone and 150 ml water. The emulsion in this example was identified as sample 161-D.

EXAMPLE 2

In this example a copolymer emulsion of isoprene-sodium styrene sulfonate was prepared in the same way as that of Example 1, except the recipe and reaction conditions were somewhat different. In this example the reaction was carried out at 55° C. for five hours. The various ingredient quantities were as follows. Isoprene at 1020 grams, sodium styrene sulfonate 30 gms, water 1500 gms, sodium Lauryl sulfonate 75 gms, dodecylthiol 3.0 gms and potassium persulfate 3.75 gms. The sample of this run was identified as 172-D.

EXAMPLE 3

In order to convert the copolymers of isoprene-sodium styrene sulfonate to copolymers of isoprene-zinc styrene sulfonate dialysis experiments were conducted. Thus, in order to exchange the sodium ions to zinc ions, dialysis membrane tubings having molecular cut off range of 6000–8000 manufactured by Spectra-POR were used. Before using for ion exchange process, the membrane tubings were boiled in a 2% solution of sodium hydrocarbonate ($NaHCO_3$) for about 1 hour and were then washed thoroughly with distilled water both inside and outside. The tubings were clamped at one end and appropriate quantities of emulsions of Example 1 and 2 were placed in the tubings with proper identifications. Precautions were taken to leave sufficient empty space in the tubes for expansion. After clamping the other end the tubes were placed in 3 liter solutions of 0.1 molar zinc acetate with mild agitation. Generally not more than 2 tubes of a particular emulsion were placed in the beaker. The dialysis experiment was allowed to continue for the next 18–20 hours. At the end of the experiment it was observed that the tubes were somewhat expanded and there was no apparent coagulation and discoloration of the emulsion had occurred. In order to ensure that sodium ions have been exchanged with the zinc ions, elemental analysis of small quantities of the dried emulsion products were carried out. The following table shows that the dialysis experiments were successful.

TABLE III

Elemental Analysis of Isoprene-Sodium Styrene Sulfonate Copolymers Before and After Dialysing the Copolymer and Exchanging the Sodium Ions to Zinc Ions

| Sample | % Na | % Zn | % S | Comments |
|---|---|---|---|---|
| 161-D | 0.68 | 0.0010 | 1.46 | (ISS-Na Salt) |
| (Before dialysis) | 0.65 | 0.0009 | 1.53 | |
| 161-D | 0.12 | 1.69 | 1.62 | |
| (After dialysis) | 0.14 | 2.05 | 1.64 | (ISS-Zn Salt) |
| 172-D | 0.26 | 0.0008 | 0.51 | |
| (Before dialysis) | 0.26 | 0.0008 | 0.50 | (ISS-Na Salt) |
| 172-D | 0.060 | 1.88 | 1.18 | |
| (After dialysis) | 0.076 | 2.07 | 1.18 | (ISS-Zn Salt) |

EXAMPLE 4

As mentioned earlier in the text that for the present invention, it is desired to have a good control over the strength of interactions between ionic copolymers of isoprene-zinc styrene sulfonate and amine containing polymers. A variety of amine containing polymers could be used which form interpolymer complexes with zinc or other transition-metal salts sulfonated styrene isoprene copolymers. For illustrative purposes an amine containing polymer, viz; copolymer of styrene-4 vinyl pyridine (SVP) was prepared. Typical methods of preparing SVP copolymers were employed. Such methods have been previously disclosed in a number of issued U.S. Patents e.g. U.S. Pat No. 4,575,530.

In a five liter glass reactor following ingredients were added: distilled deionized water 2084 gms, styrene 868 gms, 4-vinylpyridine 82 gms, sodium lauryl-sulfate 56 gms, potassium persulfate 3.45 gms, and dodecythiol 1.0 gm. The mixture was purged with dry nitrogen for 1 to 2 hours to remove dissolved oxygen. The mixing was then started and solution was heated to 55° C. The reaction was allowed to continue for 18 hours. At the end the polymer was precipitated by dumping the emulsion in 150 ml of water containing 1.5 gms of hydroquinone. Subsequently, the polymer was washed with acetone and dried in vacuum at ~60° C. for 24 hours. Elemental analysis of this product showed that the polymer had about 4 mole % vinyl pyridine. The polymer molecular weight ranged from about 300,000 to 700,000 as judged by measuring its intrinsic viscosity at room temperature which was about 1.1 dl/gm in xylene.

EXAMPLE 5

The following table shows the composition of various hot melt adhesive blends made using the copolymers of isoprene-sodium styrene sulfonate of examples 1 and 2 and isoprene-zinc styrene sulfonate copolymers of example 3 with styrene 4-vinyl pyridine polymer (SVP) of example 4. A commercial tackifier ESCOREZ-1310 manufactured by Exxon Chemical Co. was used in all the blends. To facilitate the blending a polar plasticizer zinc stearate which solvates the ionic linkage at high temperature was also used. All the blends were prepared on a small laboratory size hot two roll mill at about 150° C. After ensuring that all the ingredients were satisfactory mixed which took about 10-15 minutes the blends were removed.

TABLE IV

Composition of Blends of Copolymers with SVP and Petroleum Tackifying Resins

| Sample | Blend # 1 | 2 | 3 | 4 | 5 | 6 | 7 | 8 |
|---|---|---|---|---|---|---|---|---|
| 161-D (Na Salt) (Before dialysis) | 100 | 80 | — | — | — | — | — | — |
| 172-D (Na Salt) (Before dialysis) | — | — | 100 | 80 | — | — | — | — |
| 161-D (Zn Salt) (After dialysis) | — | — | — | — | 100 | 80 | — | — |
| 172-D (Zn Salt) (After dialysis) | — | — | — | — | — | — | 100 | 80 |
| SVP (of Example 4) | — | 20 | — | 20 | — | 20 | — | 20 |
| E-1310 (Tackifying Resin) | 100 | 100 | 100 | 100 | 100 | 100 | 100 | 100 |
| Zn (St)$_2$ (Polar Plastizier) | 10 | 10 | 10 | 10 | 10 | 10 | 10 | 10 |

EXAMPLE 6

To determine the adhesive strengths of blends of example 5, peel strength data according to the ASTM D-429 test method were obtained. Test specimens of each blend were made by pressing the blends in Mylar sheets using a hot press under mild pressures. Rectangular strips of ¼" width and 3" long (thickness of about 25 mils) were cut and 90° peel tests (trouser tests) were performed on an Instron at room temperature. The resin free sections of the Mylar film were clamped into the air jaws of the Instron to avoid any slippage during pulling. The crosshead speed of the Instron was 2"/min. The peel strength or the adhesive strength of each sample was recorded as the force necessary to pull apart the Mylar sheets. Average data of at least three specimens of each blend is reported in Table 5.

TABLE 5

| Blend No. (of Example 5) | Peel Strength (Pound Force) | Comments |
|---|---|---|
| 1 | 1.20 | — |
| 2 | 3.75 | — |
| 3 | 0.83 | Adhesive Transfer |
| 4 | 0.70 | Adhesive Transfer |
| 5 | 6.83 | — |
| 6 | 7.33 | — |
| 7 | 2.88 | — |
| 8 | 3.67 | — |

It is very clear from the data presented in the above Table 3 that blends incorporating SVP and zinc salts of copolymers of isoprene-styrene sulfonate have significantly higher adhesive strengths than those containing sodium salts of copolymers of isoprene-styrene sulfonate. Thus comparing blend number 6 with 2 and 8 with 4, adhesive strengths of more than a factor of five is observed.

It is also contemplated that the compositions described in the instant invention can be deposited by solvent casting from suitable solvent systems. Due to the strong ionic associations prevalent with these sulfonated ionomers, suitable solvents must be selected with care. Often solvent mixtures comprised of a hydrocarbon and a low level of a polar cosolvent can be employed such as 5 to 10% by volume of a volatile alcohol.

What is claimed is:

1. An adhesive composition which comprises:
   (a) a copolymer complex of an amine containing copolymer and a neutralized sulfonated polymer having about 0.2 to 3 weigh percent of chemically combined sulfur wherein said neutralized sulfonated polymer comprises at least 80% by weight of at least one conjugated diene having from 4 to 12 carbon atoms and a minor proportion of a metal or amine neutralized sulfonate monomer characterized by the formula:

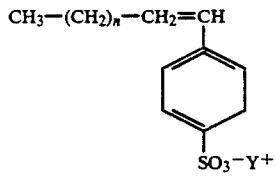

wherein n=1 or 2, wherein said sulfonate containing copolymer has a level of crystallinity of less than 25% and the polymeric backbone of said sulfonate containing copolymer has a solubility parameter of less than 10.5 and Y is said amine containing copolymer and is characterized by the formula:

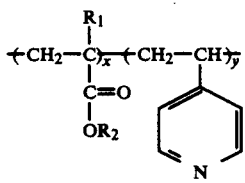

wherein $R_1$ is H or an alkyl group having about 1 to about 8 carbon atoms, $R_2$ is an alkyl group having about 1 to about 18 carbon atoms, x is about 50 to about 99.8 weight percent, y is about 0.136 to about 34 weight percent, and a minimum of three basic groups must be present on the average per polymer molecule and the basic nitrogen content generally will range from 2 meq. per 100 grams of polymer up to 500 meq. per 100 g, wherein a weight ratio of said neutralized sulfonate containing copolymer to said amine containing copolymer is 20/1 to 1/20; and (b) about 25 to about 200 parts by weight of a hydrocarbon tackifying resin based on a petroleum or coal tar distillate per 100 parts by weight of said sulfonate containing polymer.

2. A composition according to claim 1, wherein said sulfonate containing monomer is a copolymer of isoprene/metal neutralized sulfonated styrene.

3. A composition according to claim 2 wherein said conjugated diene is isoprene.

4. A composition according to claim 2, wherein said conjugated diene is 1,3-butadiene.

5. A hot melt adhesive according to claim 1 further including about 3 to about 75 parts by weight of an ionic preferential plasticizer per 100 parts by weight of said polymer complex, wherein said preferential plasticizer is selected from the group consisting of carboxylic acids having about 8 to about 22 carbon atoms, metallic salts of said carboxylic acids, amides having an aliphatic group of about 8 to about 22 carbon atoms, amines, ureas and thio-ureas and mixtures thereof.

6. A hot melt adhesive according to claim 5, wherein said preferential plasticizer is said metallic salt of said carboxylic acid.

7. A hot melt adhesive composition according to claim 6, wherein said metallic salt of said carboxylic acid is zinc stearate.

8. A hot melt adhesive composition according to claims 1 or 2 further including about 5 to about 800 parts by weight of a filler per 100 parts by weight of said sulfonate containing polymer, said filler being selected from the group consisting of calcium carbonates, silicas, carbon blacks, clays and talcs and mixtures thereof and/or less than about 100 parts by weight of an oil having less than 2 wt. % polars per 100 parts by weight of said sulfonate containing polymer, wherein said oil is selected from the group consisting of low viscosity aromatic, naphthenic or paraffin petroleum oils.

9. A hot melt adhesive composition according to claim 1, wherein said hydrocarbon resin has about 5 to about 6 carbon atoms and consists of aliphatic dienes, mono and di-olefins and cyclic olefins.

10. An adhesive composition according to claim 1 further including a solvent.

11. An adhesive composition according to claim 1, wherein said amine containing polymer is a copolymer of styrene/vinylpyridine.

* * * * *